(12) United States Patent
Samodell et al.

(10) Patent No.: US 7,238,916 B2
(45) Date of Patent: Jul. 3, 2007

(54) ROBOTIC WELDING CELL UNIT

(75) Inventors: Ralph M. Samodell, Willoughby Hills, OH (US); Samir F. Farah, Seven Hills, OH (US); Ignatius L. DiNovo, Mentor, OH (US); Roy R. Scripp, Mentor, OH (US); William T. Matthews, Chesterland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 249 days.

(21) Appl. No.: 10/992,890

(22) Filed: Nov. 19, 2004

(65) Prior Publication Data

US 2006/0108342 A1    May 25, 2006

(51) Int. Cl.
   *B23K 9/00* (2006.01)
(52) U.S. Cl. .................... 219/125.1; 219/136; 219/158; 901/42
(58) Field of Classification Search ............. 219/125.1, 219/137.9, 136, 158; 901/42
See application file for complete search history.

(56) References Cited

U.S. PATENT DOCUMENTS

| | | | |
|---|---|---|---|
| 5,406,050 A * | 4/1995 | Macomber et al. | 219/130.1 |
| 5,643,477 A * | 7/1997 | Gullo et al. | 219/121.86 |
| 6,276,284 B1 * | 8/2001 | Remley et al. | 108/20 |
| 6,314,686 B1 * | 11/2001 | Scherer et al. | 52/36.1 |
| 6,369,357 B1 * | 4/2002 | Baum et al. | 219/136 |
| 6,596,972 B1 * | 7/2003 | Di Novo et al. | 219/137.9 |
| 6,750,429 B2 * | 6/2004 | Bogner et al. | 219/136 |
| 6,772,932 B1 * | 8/2004 | Halstead | 228/45 |
| 6,787,726 B2 * | 9/2004 | Thelen et al. | 219/54 |
| 6,803,541 B2 * | 10/2004 | Andersen et al. | 219/130.1 |
| 2002/0170884 A1 | 11/2002 | Thelen et al. | |

* cited by examiner

*Primary Examiner*—Kevin P. Kerns
(74) *Attorney, Agent, or Firm*—Fay Sharpe LLP

(57) ABSTRACT

A portable welding cell unit includes a frame structure in which first and second welding stations are disposed. A robot arm is also provided within the frame. The robot arm can pivot between the first and second welding stations such that a work piece can be welded in the first welding station while a work piece is being loaded into or unloaded from the second welding station.

74 Claims, 14 Drawing Sheets

ROBOTIC WELDING CELL UNIT

BACKGROUND OF THE INVENTION

Robots have been used in welding operations for some time. An example of such is disclosed in U.S. Pat. No. 6,772,932, which is incorporated by reference. Typically, a robot arm having a welding torch at a distal end welds a work piece positioned on a work table. The work table is located in a welding cell and the robot is programmed to weld along a desired path.

To increase the efficiency of these robot welding units, often times two work tables or robotic cells are provided. As the welding operation takes place in a first cell, in a second cell the completed work piece is being removed from the table and a new work piece is being placed onto the table. Upon completion of the weld in the first cell, the robot moves to the second cell having the newly placed work piece positioned on the work table and begins welding the newly placed work piece in the second cell.

These dual cell Welding units are typically assembled on site. Large capital expenditures are required to assemble these welding units. If the welding operation is only temporary or a potential customer would simply like to try out such a unit, such situations are typically cost prohibitive.

SUMMARY OF THE INVENTION

A portable welding cell unit includes a frame structure in which first and second welding stations are disposed. A robot arm is also provided within the frame. The robot arm can pivot between the first and second welding stations such that a work piece can be welded in the first welding station while a work piece is being loaded into or unloaded from the second welding station.

The portable welding cell unit can be dimensioned to fit into the bed of a pickup truck. The unit can include collapsible side walls that allow the unit to be more easily fitted into the bed of a pickup truck while in a retracted position. The walls can also expand to provide the robot arm more freedom of movement around the welding stations. To facilitate loading the portable unit onto a truck, forklift receptacles can be provided on adjacent sides of the unit so that the unit can be picked up from each side.

Flash barriers can be provided in the unit to protect personnel during the loading of work pieces into the unit. For example, the doors can slide into the unit protecting a worker from the welding operation going on in the first welding station while he is loading or removing a work piece from the second welding station. Alternatively, a fixed flash barrier can also be provided between the first welding station and the second welding station.

BRIEF DESCRIPTION OF THE DRAWINGS

Reference will now be made to the drawings that illustrate various embodiments that the invention may take in physical form and certain parts and arrangements of parts wherein.

DETAILED DESCRIPTION OF THE PREFERRED EMBODIMENTS

Figure 1:
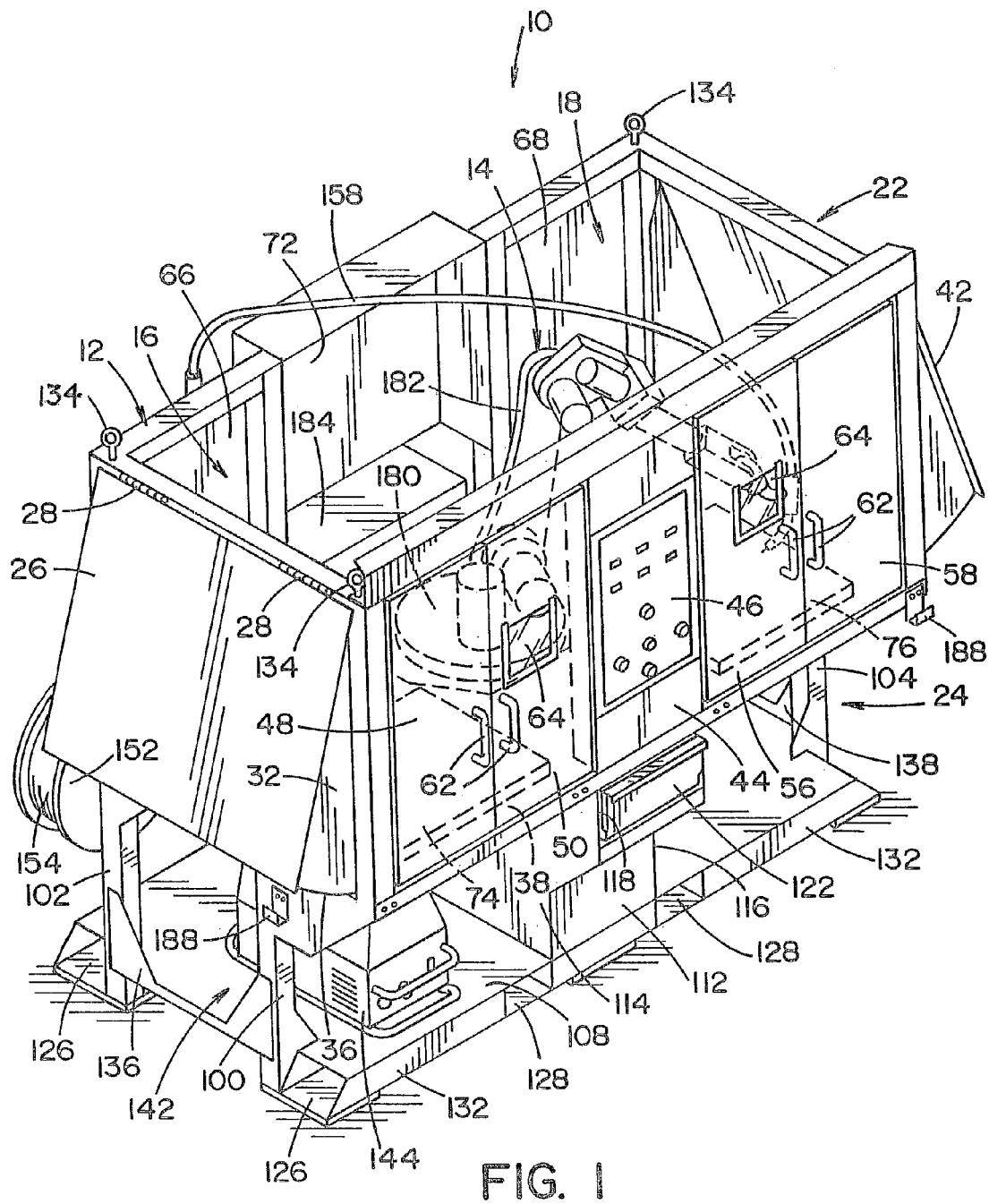
FIG. 1 is a perspective view of a portable welding cell unit.

A portable welding cell unit 10 generally includes a frame 12, a robot 14 disposed within the frame, first and second welding stations 16 and 18 disposed within the frame and other components that will be described in more detail below. The frame 12 can generally be described as including an upper frame portion 22, which is enclosed with the exception of the top, to define the first and second welding stations 16, 18, and an open lower frame portion 24, which supports the upper frame portion. Both the upper frame portion 22 and the lower frame portion 24 have a generally rectangular parallelopiped configuration.

With reference to FIG. 1, the sides and bottom of the upper frame surround the welding stations 16 and 18. The side walls of the cell unit 10 can move to allow for more freedom of movement for the robot 14 inside the cell unit. In the depicted embodiment, a first upper side wall 26 attaches to the upper frame portion 22 of the cell unit via hinges 28 located at an upper edge of the side wall that allow the side wall to rotate about the hinges to enlarge the area of the first welding station 16. In this embodiment, the first upper side wall 26 is a rectangular panel; however the side wall can take other configurations dependent upon the shape of the frame. A front retractable panel 32 attaches to a front edge of the first side wall 26 and a rear retractable panel 34 (FIG. 6) also attaches to a rear edge of the first side wall 26. Each retractable panel 32 and 34 can be described as pie-shaped and pivots about line along the hinges 28. Each panel 32, 34 includes a curved lower edge to accommodate the pivoting movement. Each retractable panel 32 and 34 attaches to a retractable floor 36 that extends outwardly from a fixed floor 38 of the welding stations 16 and 18 when the first side wall 26 pivots outward. In an alternative embodiment, the retractable panels 32 and 34 do not attach to a floor, instead the area can be left open to provide a vent or access for tool plate cleaning. A second side wall 42 attaches to the upper frame portion 22 opposite from and in a similar manner to the first side wall 26, and for the sake of brevity will not be described in more detail. The second side wall 42 pivots in an opposite rotational direction as compared to the first side wall 26.

Moving to the front of the cell 10, a central front panel 44 mounts to the upper frame 22 and a control panel 46 is located on the central front panel 44 and includes a plurality of controls to operate the cell 10.

A first set of double doors provides selective access to the first welding station 16 and a second set of double doors provides selective access to the second welding station 18. As more clearly visible in FIG. 2, the first set of double doors includes an outer door 48 and an inner door 50. The inner door 50 attaches to the upper frame portion 22 via an upper pin 52 and a lower pin 54. The inner door 50 not only pivots about the pins 52 and 54; the inner door can also slide inward into the upper frame 22 when the inner door has been opened 90 degrees from the closed position, as more clearly visible in FIG. 3. The outer door 48 also attaches to the upper frame portion 22 via pins, similar to the inner door 50 and can slide inward into the upper frame 22, similar to the inner door. Similarly, the second set of doors includes an inner door 56 and an outer door 58 that pivotally attach to the upper frame portion and can slide into the upper frame portion.

The inner doors 50 and 56, when retracted into the upper frame portion 22, can act as a flash barrier, and therefore are made from an appropriate arc shielding material known in the art. With specific reference to FIG. 3, as a work piece A is being welded in the second welding station 18, the inner door 50 of the first set of doors is retracted into the upper frame portion 22. The inner door 50 pivots about pins 52 and 54 located adjacent the central front panel 44 located to a side of the first welding station 16 nearer the second welding station 18. The inner door 50 protects the user of the cell unit 10 as he changes out the work piece B in the first welding station 16. Likewise, the inner door 56 can pivot and retract into the upper frame portion 22 to protect the worker as he changes out the work piece B in the first welding station 16. Vertically oriented handles 62 can be provided for each door. The vertical orientation allows the doors to retract further into the upper frame portion 22 as compared to a horizontal handle. Also, a window 64 can be provided on the doors. The window 64 can be made with auto-darkening glass, similar to a lens in a known welder's helmet.

With reference back to FIG. 1, two outer rear panels, a first outer rear wall 66 and a second outer rear wall 68, attach to the rear of the upper frame portion 22. In this embodiment, the rear walls 66 and 68 are at least substantially perpendicular to the retracted or unexpanded side wall panels 26 and 42 and are generally in the same plane as one another. A rear central knockout wall 72 is interposed between, generally parallel to and spaced from the first and second rear walls 66 and 68. The rear central knockout wall 72 extends over the lower frame portion 24 and provides clearance for the robot as it pivots between the work stations. The rear knockout wall 72 provides the robot 14 more freedom of movement when rotating between the first welding station 16 and the second welding station 18.

The floor 38 of the welding stations attaches to the upper frame 22 and supports a first welding table 74 for the first welding station 16 and a second welding table 76 for the second welding station 18. Clamps 78 or other retaining mechanisms are located on the first welding table 74 to selectively secure the work piece B on the welding table as it is being welded. Likewise clamps 82 are also provided on the second welding table 76. The welding tables 74 and 76 are similar to conventional welding tables and are removable, versatile and grounded.

Figure 2:
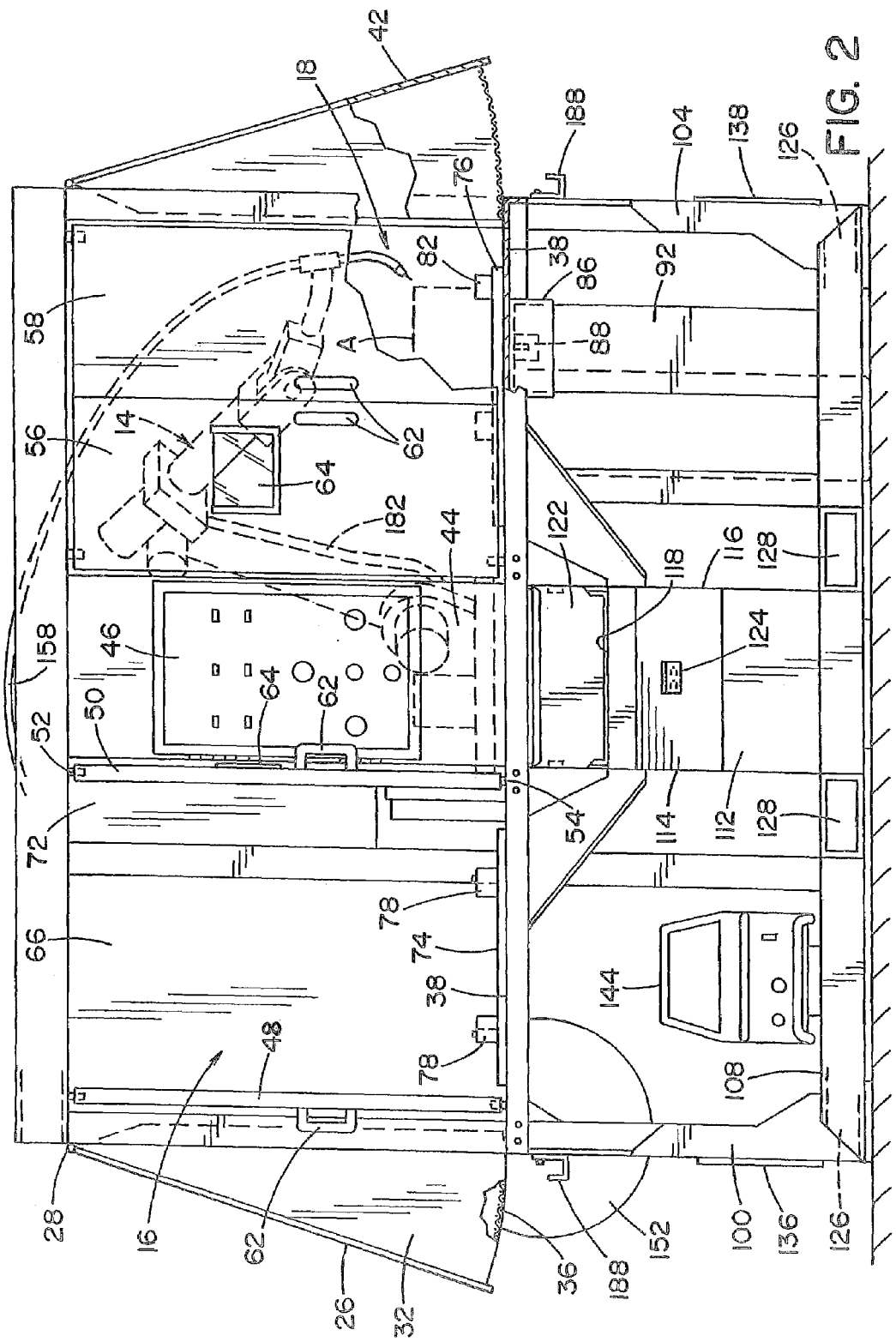
FIG. 2 is a front elevation view with portions broken away of the portable welding cell unit of FIG. 1.
Figure 3:
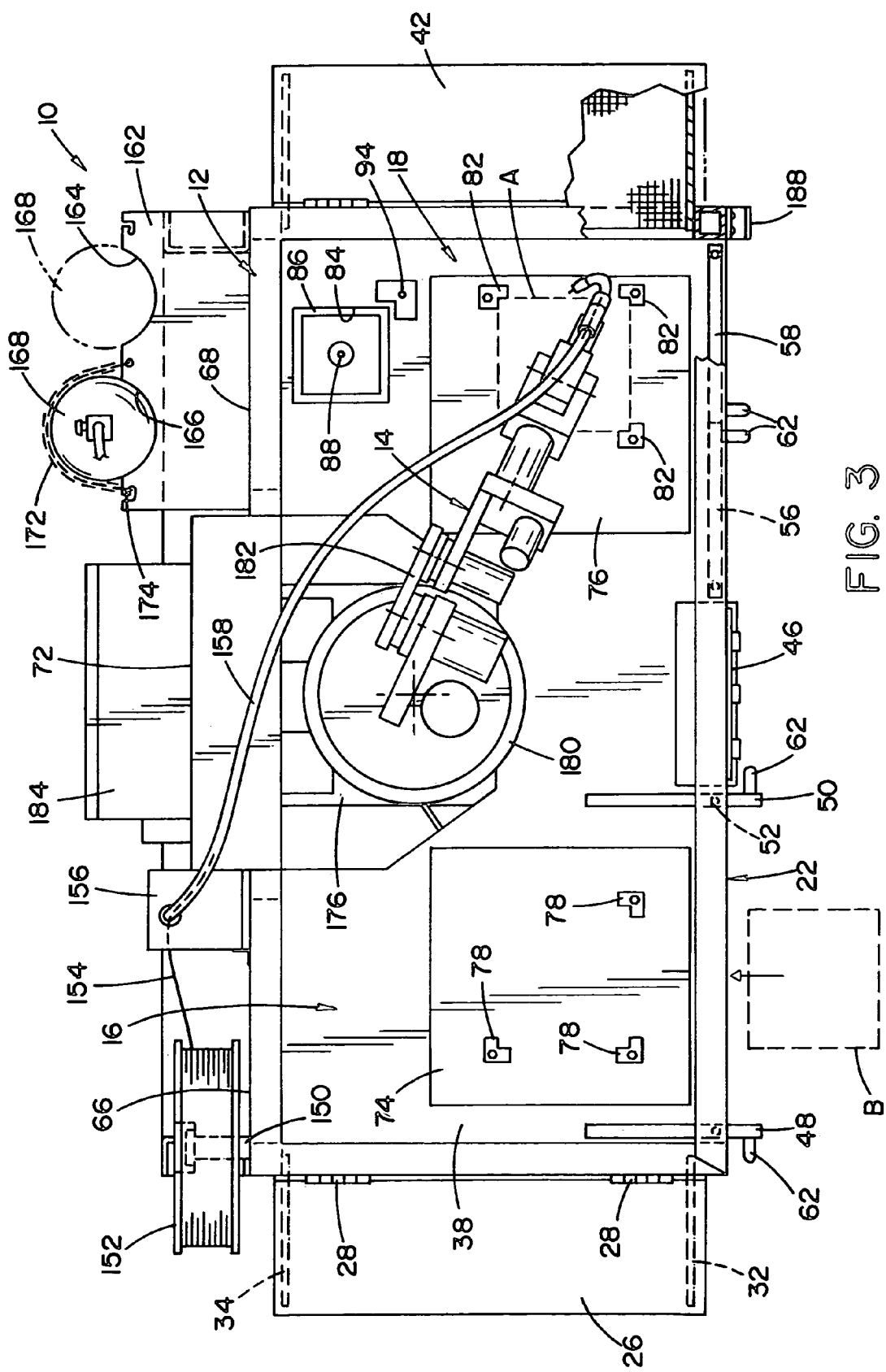
FIG. 3 is a top plan view with portions broken away of the portable welding cell unit of FIG. 1.

With reference to FIG. 3, an opening 84 in the floor 38 behind the second welding table 76 leads to a compartment 86 (FIG. 2) that has torch conditioning devices 88, such as reamers and the like, stored in the compartment. The torch conditioning devices clean and maintain the welding torch during the welding operations, and such devices are well known in the art so that further description is not required. The torch conditioning compartment 86 rests on a support 92 (FIG. 2). Even though the torch conditioning compartment 86 has been placed behind the second welding table 76 in this embodiment, the compartment can be placed elsewhere in the cell unit 10.

A touch probe 94 can also be provided extending from the floor 38. The touch probe serves as a tool point reference. The touch probe 94 can be used as a datum to allow for reprogramming of the robot. Such devices are known in the art.

Figure 4:
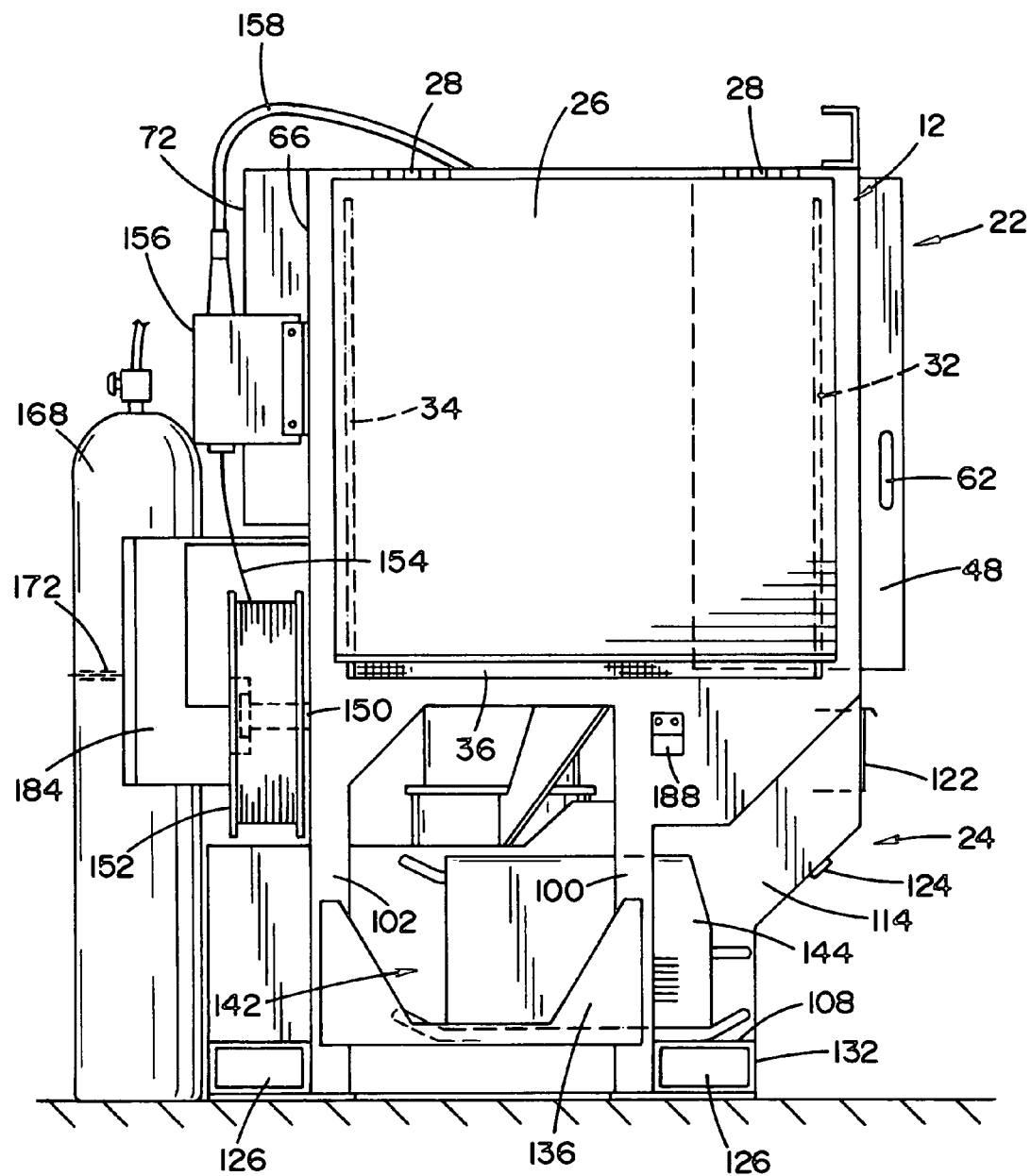
FIG. 4 is an end elevation view of the portable welding cell unit of FIG. 1.
Figure 5:
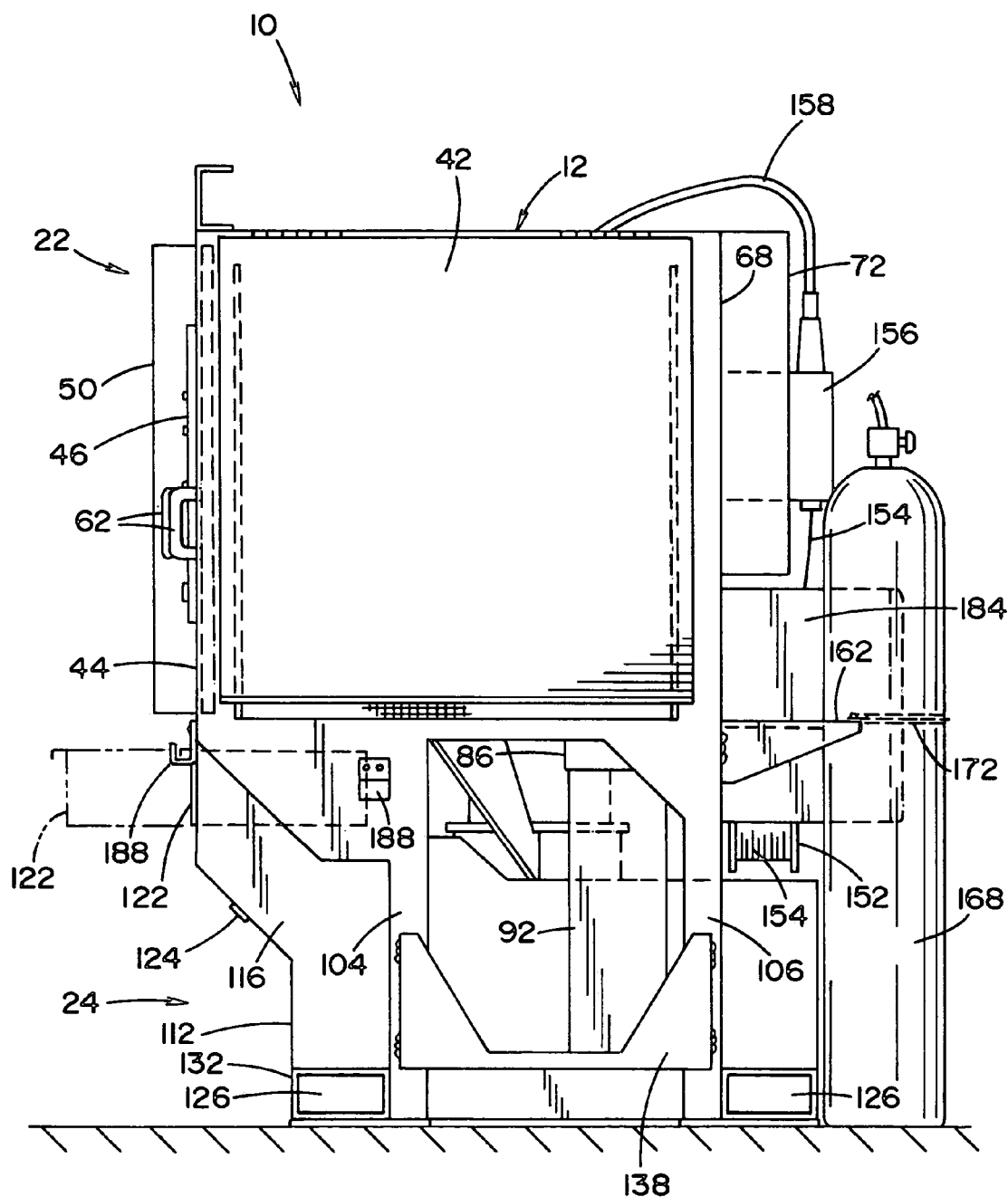
FIG. 5 is an opposite end view of that of FIG. 4 of the portable welding cell unit of FIG. 1.

With reference back to FIG. 1, as mentioned above, the lower frame portion 24 supports the upper frame portion 22. The lower frame portion 24 includes a plurality of upright supports 100, 102, 104 and 106 (FIGS. 3–5) located near the corners of the lower frame portion that support the upper frame portion 22. The lower frame portion 24 also includes a floor surface 108 that is situated below the floor surface 38 of the upper frame portion 22.

A central lower front panel 112 extends upwardly from the floor 108 of the lower frame portion 24. The central lower front panel 112 is formed such that a lower portion thereof extends upwardly at least substantially vertically from the floor 108 and then angles forwardly and upwardly toward the front central panel 44 on the upper frame portion 22. Complementarily shaped side walls 114 and 116 abut the front panel 112 and define an opening 118 that receives a drawer 122. The drawer 122 is conveniently located to receive tools, and the like, that would be useful during welding operations. As more clearly seen in FIG. 2, an outlet plug 124, which can be in electrical communication with a power source for the cell 10, can be provided on the front panel 112 so that auxiliary power tools and/or lighting can be plugged in.

As seen in FIG. 1, the floor 108 of the lower frame portion 24 is spaced above the ground or other surface upon which the cell 10 is supported. The cell unit 10 has four-way forklift access. Side forklift receptacles 126 are formed on each end of the lower frame portion 24. Front/rear forklift receptacles 128 extend from the front to the rear of the lower frame portion 24. Horizontal support members 132 define the forklift openings 126 and 128 and space the floor 108 from the ground or other support surface. The frame 12 is described as including openings or receptacles to receive and trap the forks of an associated forklift; however the openings or receptacles need not have the exact shape as shown. The frame 12 could simply have a support spaced from the ground to allow forklift access to define the forklift receptacles.

In addition to and/or instead of fork lift receptacles, hooks, which in the depicted embodiment are eyebolts 134, are provided so that the cell can be lifted from the top. The hooks can be removable so that they are not in the way if a hood is used with the cell.

A first outer lower side wall 136 interconnects the forward vertical upright support 100 to the rearward vertical upright support 102. A second outer lower side wall 138 interconnects the forward vertical upright support 104 to the rearward vertical upright support 106. Each of the lower side walls 136 and 138 can include a central portion that is shorter than the portion that fastens to a respective support. Each side wall can include an angled upper edge between the lower central edge and the taller end edges.

The lower frame portion 24 can define a welder compartment 142 between the side wall 114 that abuts the lower central panel 112 and the outer lower side wall 136 that interconnects the forward vertical upright support 100 to the rearward vertical upright support 102. A welder 144 is situated on the floor 108 in the welder compartment 142. The welder 144 can electrically connect to one common input feed fusible disconnect (not shown) to a power source for the cell unit 10.

Figure 6:
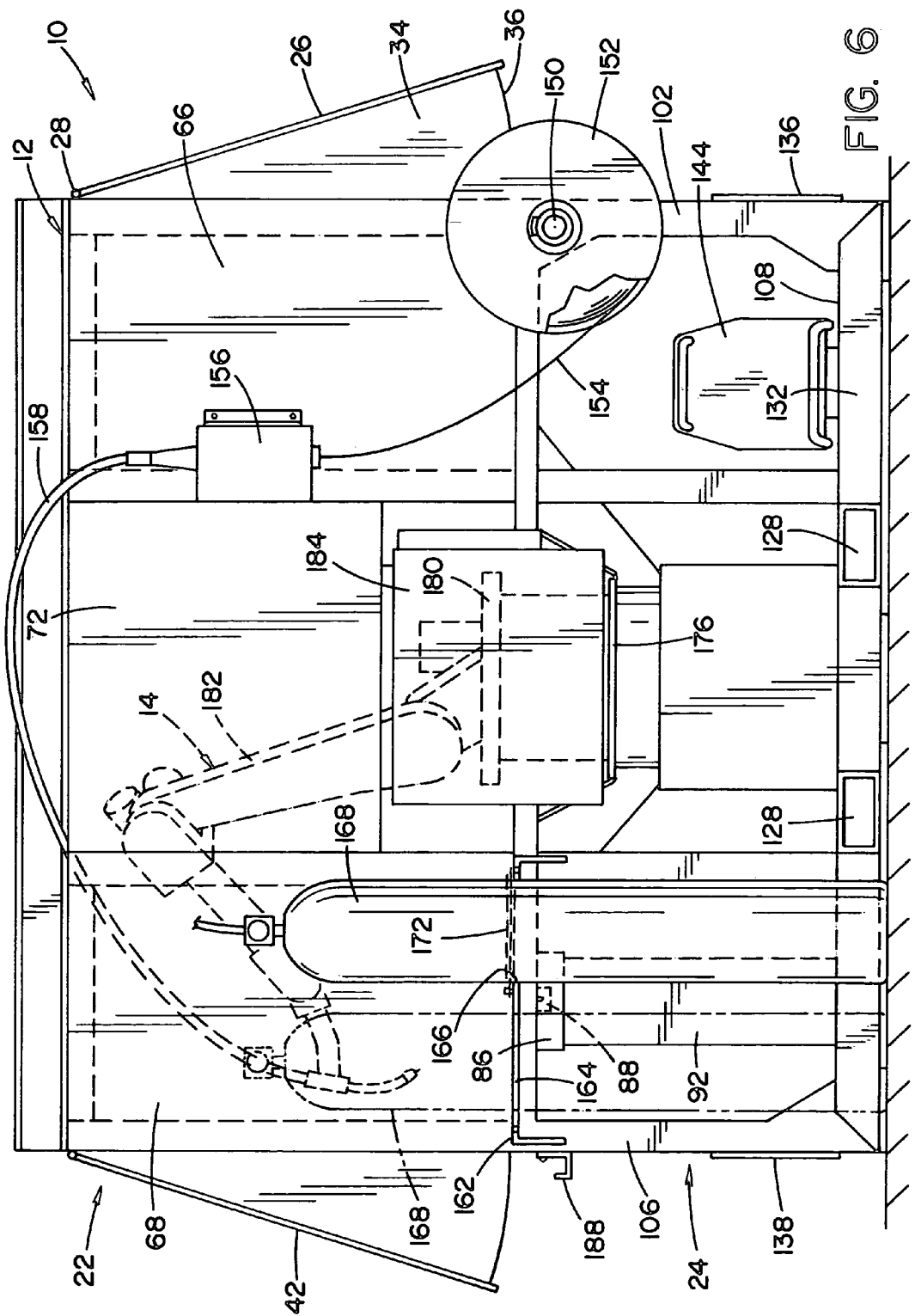
FIG. 6 is a rear elevation view of the portable welding cell unit of FIG. 1.

As most clearly seen in FIG. 6, a feed wire shaft 150 extends from the rear of the lower frame portion 24. A supply reel 152 of consumable welding electrode wire 154 can mount to the shaft 150. A wire feed motor 156 also mounts to the upper frame 22 to deliver the wire 154 to the robot 14. The wire is fed through a flexible tube or conduit 158 that attaches to the robot 14.

With reference to FIG. 3, a guide flange 162 also attaches to the rear of the frame 12. The guide flange 162 includes arcuate surfaces 164 and 166 that complement the shape of tanks 168 that store gases used in welding operations. Chains 172 and hooks 174 can attach to the flange 162 to retain the tanks 168.

A robot support 176 extends upwardly from the floor 108 of the lower portion 24 behind the central lower front panel 112. The robot support 176, in this embodiment, is a box-like structure made of a suitable material to support the robot 14, which will be described in more detail below.

As mentioned earlier, the robot 14 is disposed in the frame 12. The robot 14 used in the depicted embodiment can be an ARC Mate® 100/Be available from FANUC Robotics America, Inc. Further description of the robot can be found in brochure ARC Mate® 100/Be & 120/Be printed by FANUC Robotics America, Inc., which is incorporated by reference. Other similar robots can also be used. The robot 14 rests on the robot support 176 and includes a turret 180 that allows the robot arm 182 to pivot between the first welding station 16 and the second welding station 18. A controller 184 for the robot 14, which is known in the art and typically accompanies the robot, extends from the rear of the frame 12. Pendant hooks 188 are provided on the frame 12 to provide a location from which to hang a pendant (not shown) that can control the robot 14.

Figure 7:
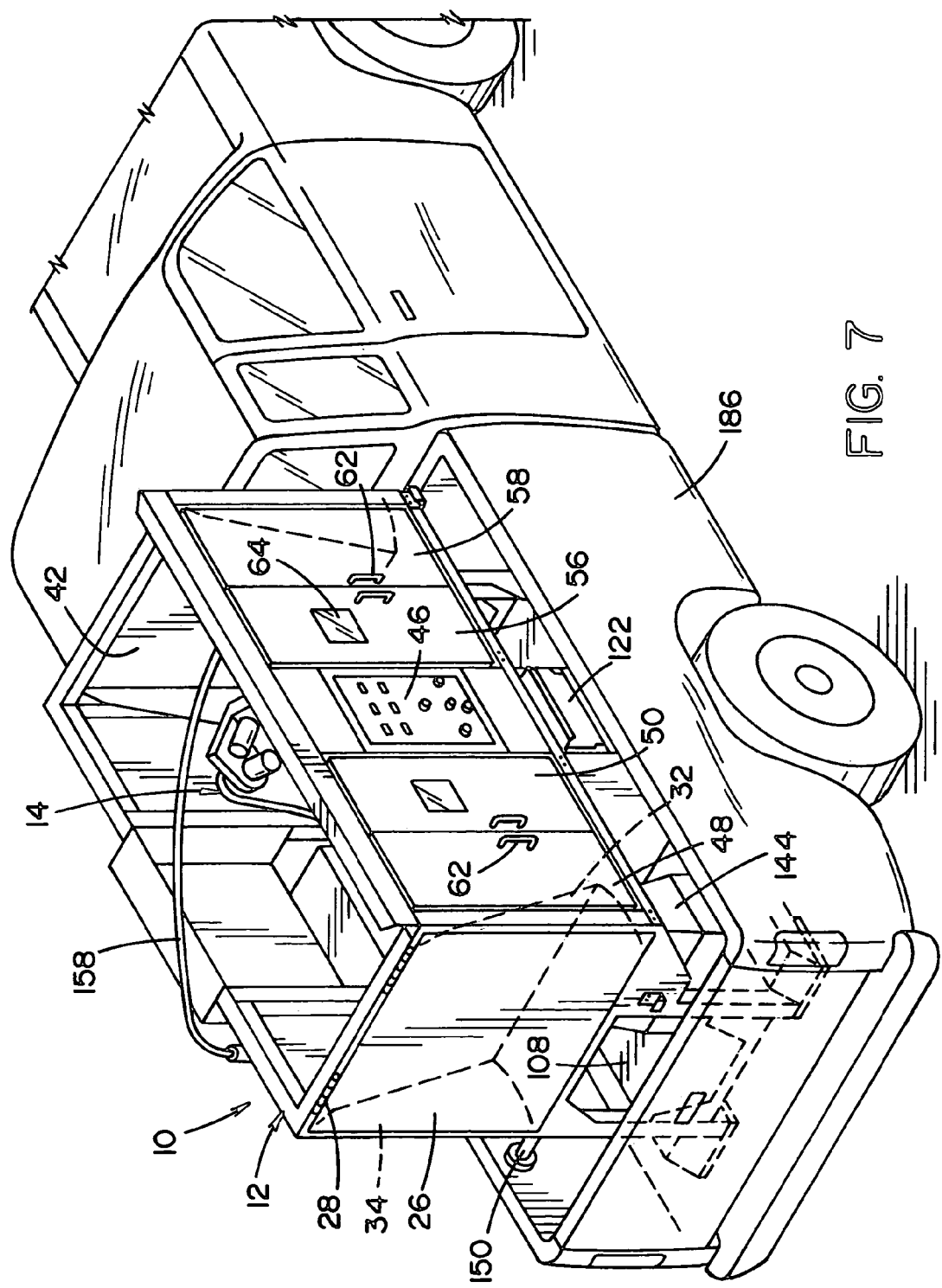
FIG. 7 is a perspective view of the portable welding cell unit of FIG. 1 disposed in the bed of a pickup truck.

As seen in FIG. 7, the portable welding cell unit 10 is dimensioned to fit in the bed of a pickup truck 186. To provide a maximum amount of space in as small a footprint as possible, the side walls 26 and 42 can collapse down during transport. Such a unit 10 can then be delivered to a factory or other site where a potential customer can try out the unit 10 and determine whether to purchase the unit. Similarly, the unit 10 can be delivered and rented for a short amount of time so that a company need not expend the large capital costs of assembling a dual cell unit in its factory. The lower floor 108 of the unit is small enough to fit in the bed of the pickup truck.

Because of the small footprint of the unit, the welder 144 can be placed below the first welding table 74 and the second welding table 76 and/or the first welding station 16 and the second welding station 18. Also, for the convenience of the operator of the unit 10, the drawer 122 can be provided in the front of the unit 10. Likewise, the outlet 124 can also be provided in the front of the unit 10 so that tools stored in the drawer 122, such as a grinder, can be plugged into the outlet 124 so that any repairs that need to be performed on the work pieces can be performed in the front of the unit.

Figure 8:
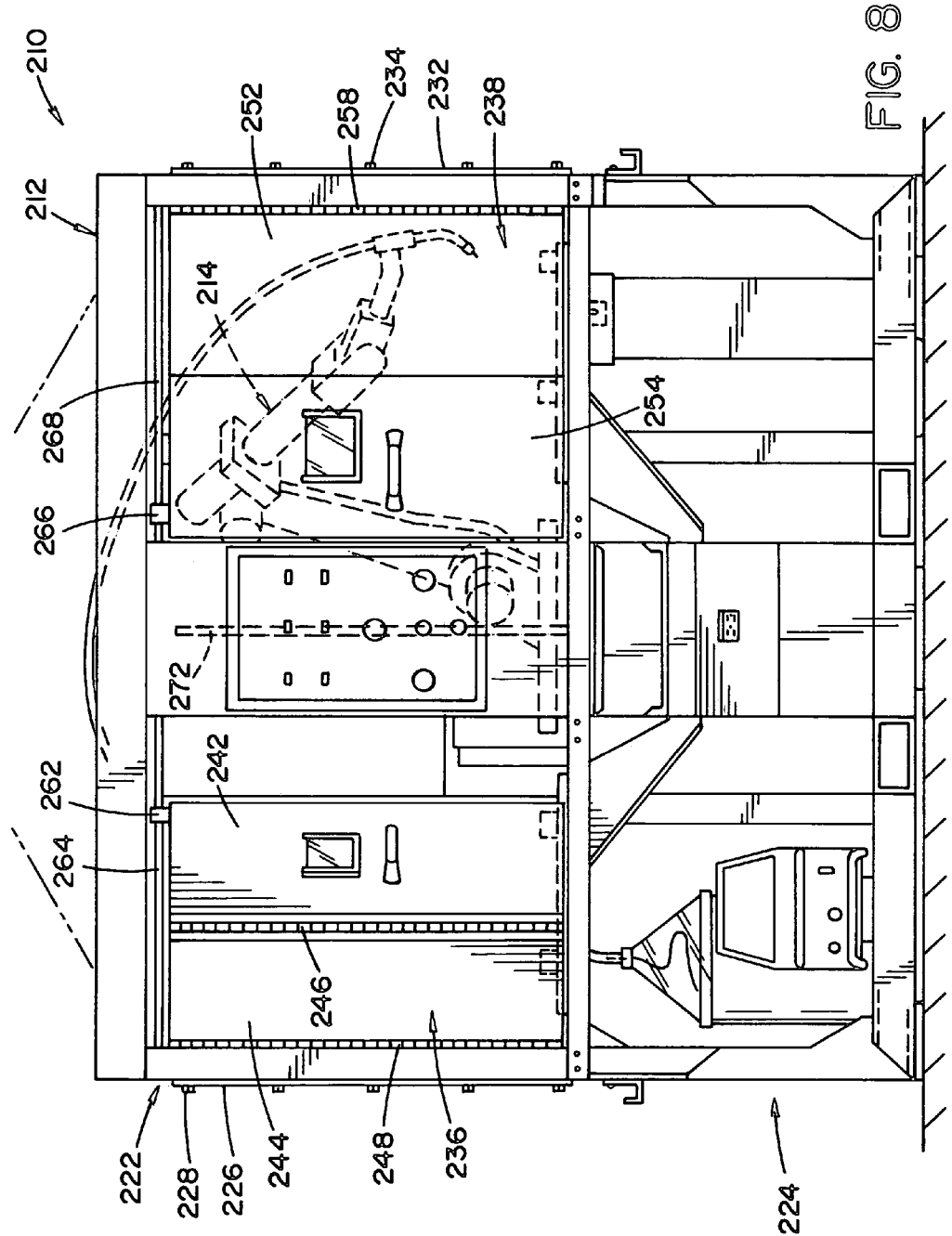
FIG. 8 is a front elevation view of an alternative embodiment of a portable welding cell unit.
Figure 9:
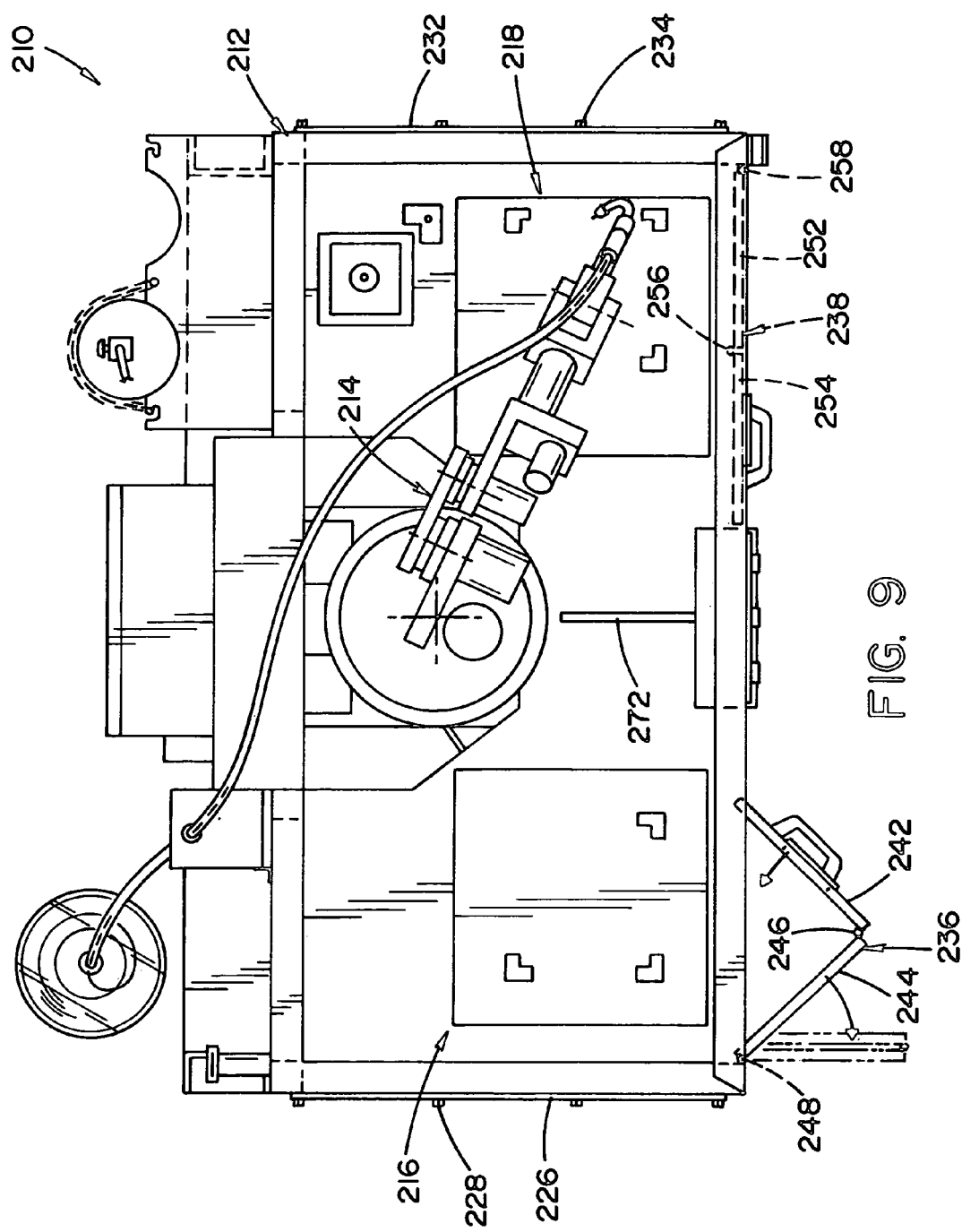
FIG. 9 is a top plan view of the portable welding cell unit of FIG. 8.
Figure 10:
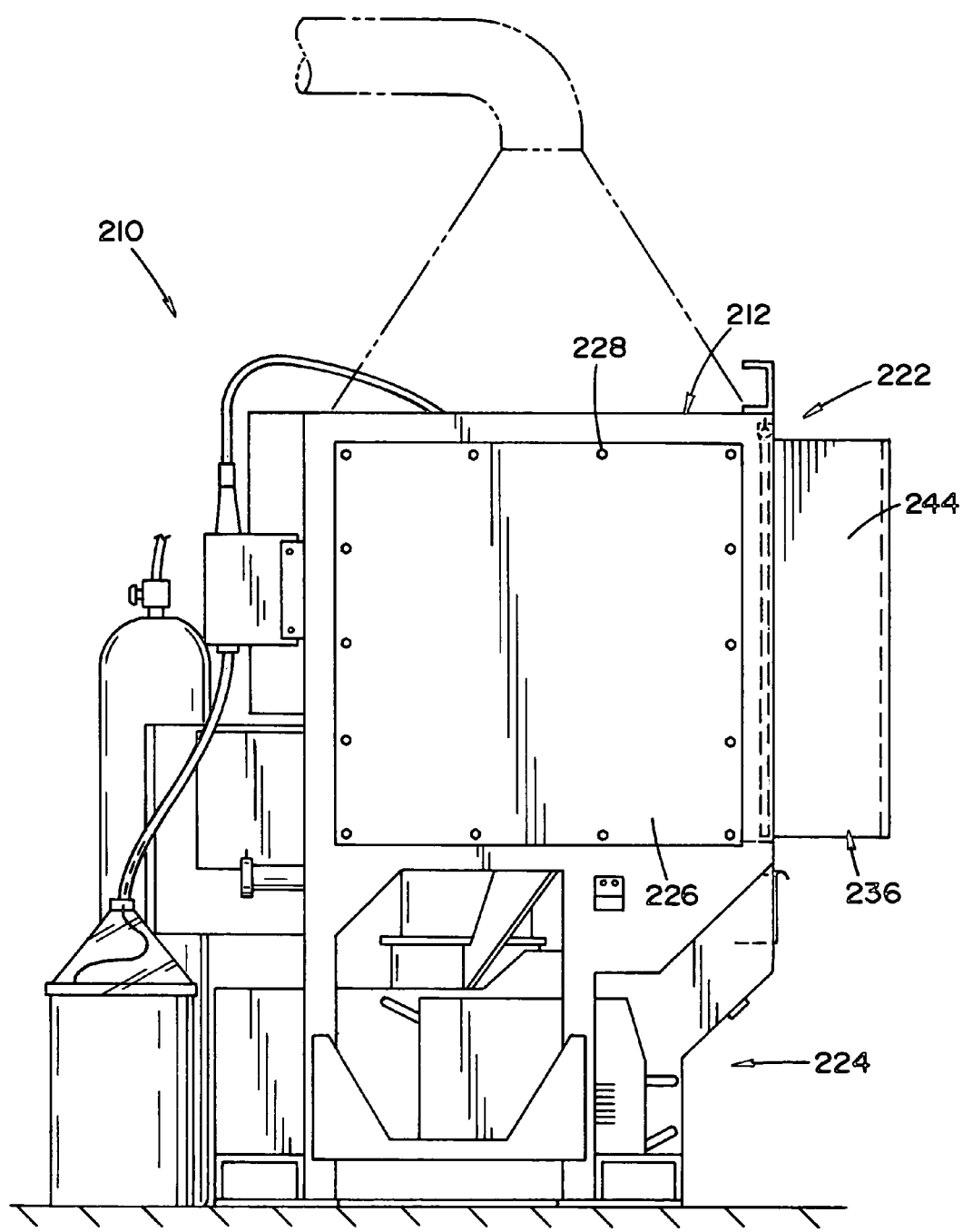
FIG. 10 is an end elevation view of the portable welding cell unit of FIG. 8 showing an exhaust hood in phantom.
Figure 11:
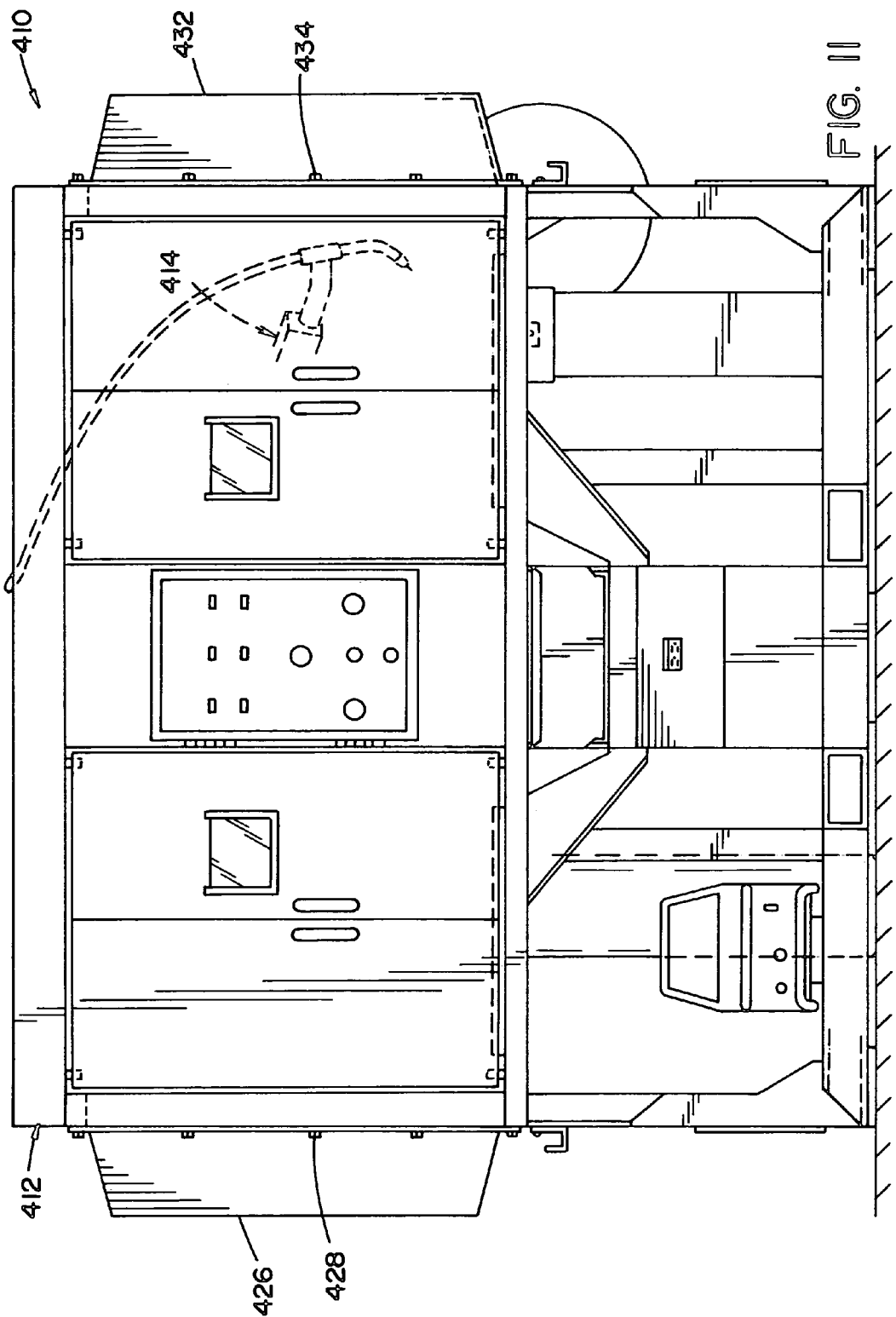
FIG. 11 is a front elevation view of another alternative embodiment of a portable welding cell unit.

FIGS. 8–10 disclose a second embodiment of a portable welding cell unit 210. This embodiment is similar to the portable welding cell unit 10 disclosed in FIGS. 1–7 in that the unit 210 includes a frame 212, a robot 214 disposed in the frame and first welding station 216 and second welding station 218 also disposed within the frame. This embodiment also includes an upper frame 222 and a lower frame 224. The upper frame is open, similar to the first embodiment, and can be used with an exhaust hood as shown in phantom.

With reference to FIG. 10, in this embodiment, a first side wall 226 attaches via a plurality of fasteners, such as bolts 228, so that the first side wall 226 is selectively removable from the frame 212 to allow for easy maintenance inside the frame. Similarly, a second side wall 232 attaches to the unit 210 opposite the first side wall 226 via a plurality of fasteners 234 so that the second side wall 232 can be selectively removed from the frame 212.

This embodiment of the cell unit 210 also includes a first door 236 and a second door 238 that provide selective access to the welding stations 216 and 218, respectively. In this embodiment, the first door 236 includes a first panel 242 attached to a second panel 244 via a hinge 246. Accordingly, the first door 236 is a folding door that rotates about a second hinge 248 that connects the outer panel 244 to the frame 212. Similarly, the second door 238 includes a first panel 252 that attaches to a second panel 254 via a central hinge 256 (shown in phantom in FIG. 9). Likewise, the door 238 also rotates about a second hinge 258 that connects the outer panel 252 to the frame 212. The first door 236 attaches to a catch 262 that cooperates with a track 264 to attach the upper portion of the inner panel 242 of the first door 236 to the frame. Likewise, the second door 238 attaches a catch 266 that slides along a track 268 that is attached to the frame 212.

In this embodiment, a flash barrier 272 (FIG. 9) is interposed between the first welding station 216 and the second welding station 218. Since the doors 236 and 238 do not retract into the frame 212 like the doors described above with reference to the first embodiment, the stationary flash barrier 272 protects personnel changing out work pieces in the welding stations.

The remainder of the portable cell unit 210 is similar to the portable cell unit 10 described in FIGS. 1–7, and therefore for the sake of brevity, will not be described in further detail.

FIGS. 11–14 disclose another embodiment of a portable welding cell unit 410. This embodiment also includes a frame 412, a robot 414 positioned inside the frame, a first welding station 416 and a second welding station 418 both disposed within the frame.

In this embodiment, the first side wall is in the form of a first outrigger 426 that attaches to the frame 412 via a plurality of fasteners such as bolts 428. Similarly, a second outrigger 432 attaches to the frame 412 via a plurality of bolts 434. Each of the outriggers 426 and 432 is similar in configuration and therefore only a specific description of the first outrigger 426 will be provided. The first outrigger 426 has a prismatoid-shape made up of four isosceles trapezoidal sides that extend from the frame 412 and a planar rectangular surface that is similar to the side walls 26 and 226 described above. Such a configuration gives the outrigger 426 a box-like configuration. The outrigger 426 is open from the frame 412 into the outrigger to provide the robot 414 more freedom of movement around the welding stations. The prismatoid configuration is not the only contemplated configuration for the outrigger 426. In other contemplated embodiments, the outrigger could also have a cube-like configuration or similar configuration, and/or be open at the bottom for venting or cleaning.

Figure 14:
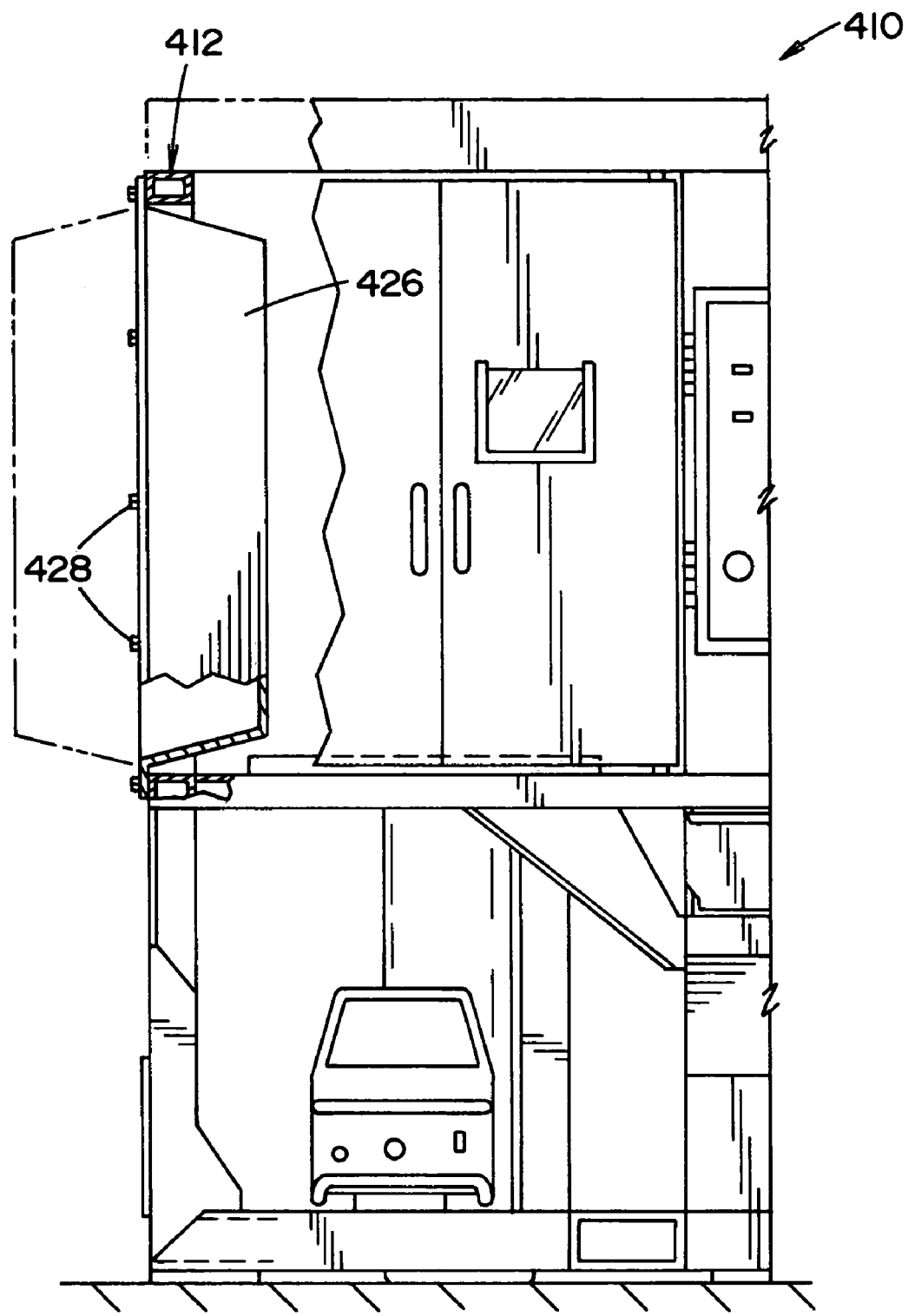
FIG. 14 is a partial front elevation view of the portable welding cell unit of FIG. 11 showing a side wall mounted for shipment of the cell unit.

Nevertheless, the prismatoid configuration facilitates shipment of the unit 410. As seen in FIG. 14, the orientation of the first outrigger 426 can be reversed such that the box-like configuration projects inwardly into the frame 412 towards the first welding station 416. This configuration facilitates shipment of the cell unit 410 in the back of a pickup truck. Furthermore, the upwardly sloped lower trapezoidal surface of the outrigger 426 facilitates placement of the outrigger into the frame 412.

Figure 12:
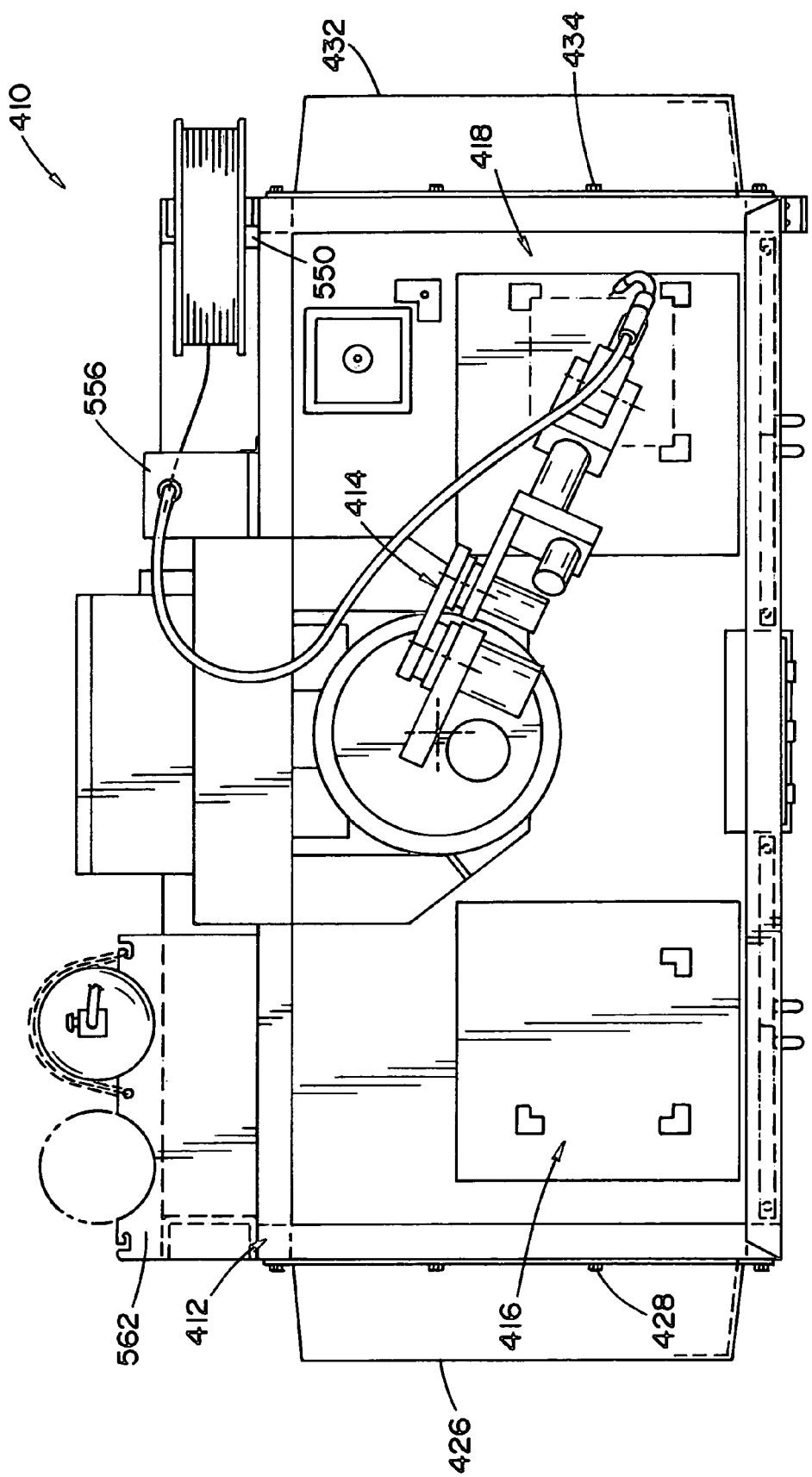
FIG. 12 is a top plan view of the portable welding cell unit of FIG. 11.
Figure 13:
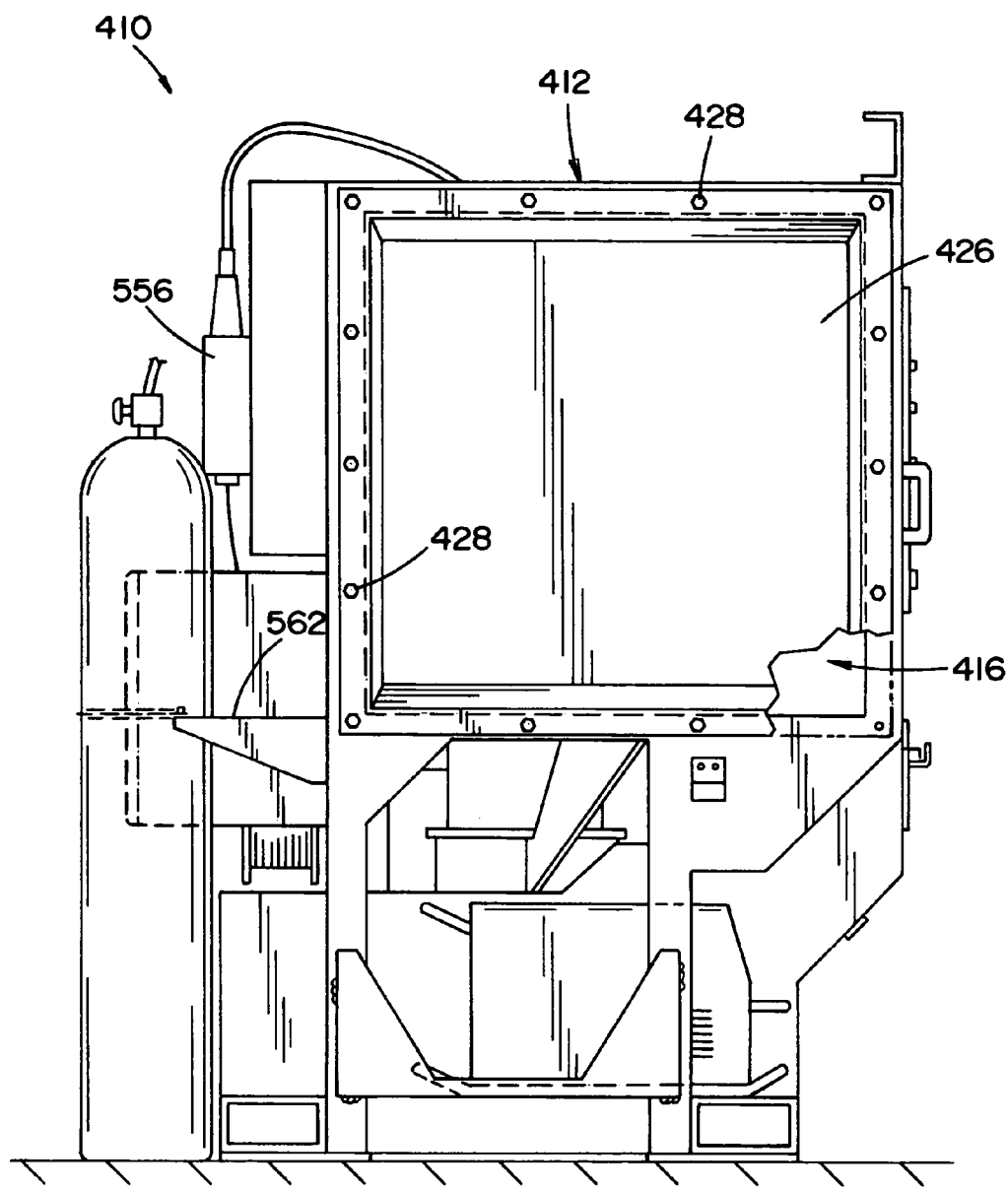
FIG. 13 is an end elevation view of the portable welding cell unit of FIG. 11.

As also can be seen when referring to FIG. 12, locations of a feed wire shaft 550, feed wire motor 556 and guide flange 562 can be reversed in any of the embodiments where it would be more convenient for the end user of the unit.

A portable welding cell unit has been described with reference to a preferred embodiment and alternatives thereof. It is believed that many modifications and alterations to those embodiments disclosed readily suggest themselves to those skilled in the art upon reading and understanding the detailed description of the preferred embodiments. The invention is intended to include all such modifications and alterations insofar as they come within the scope of the present invention.

The invention claimed is:

1. A portable welding cell unit comprising:
    a frame;
    a first welding table mounted to the frame;
    a second welding table mounted to the frame and horizontally spaced from the first welding table;
    a cell unit door movable between an open and closed position and attached to the frame for providing selective access to at least one of the first welding table and the second welding table;
    a robot disposed within the frame; and
    a side wall attached to the frame and movable between a first position to provide a first clearance area for the robot and a second position to provide a second clearance area that is greater than the first clearance area.

2. The unit of claim 1, wherein the frame is dimensioned to fit into a pickup truck.

3. The unit of claim 1, wherein the side wall is pivotally mounted to the frame.

4. The unit of claim 3, wherein the side wall in the first position is disposed at least generally perpendicular to the cell unit door in the closed position.

5. The unit of claim 1, wherein the side wall comprises a first side wall and the unit further comprises a second side wall attached to the frame and movable between a first position and a second position.

6. The unit of claim 5, wherein the first side wall is disposed opposite the second side wall.

7. The unit of claim 1, further comprising a retractable panel attached to the side wall, wherein the retractable panel is situated substantially parallel to the cell unit door in the closed position.

8. The unit of claim 7, further comprising a retractable floor attached to the side wall and the retractable panel.

9. The unit of claim 1, wherein the side wall comprises an at least substantially box-shaped outrigger.

10. The unit of claim 9, wherein the outrigger is reversible to extend outward from the frame in the first position and inward into the frame in the second position.

11. The unit of claim 9, wherein the side wall comprises a first substantially box-shaped outrigger associated with the first welding table and the unit further comprises a second substantially box-shaped outrigger mounted to the frame opposite the first substantially box-shaped outrigger and associated with the second welding table, wherein at least one of the outriggers has an open bottom.

12. The unit of claim 1, wherein the cell unit door is pivotally and slidably mounted to the frame.

13. The unit of claim 12, wherein the cell unit door is slidable to a position interposed between the first welding table and the second welding table.

14. The unit of claim 1, wherein the cell unit door comprises a first slidable door and the unit further comprises a second slidable door, wherein the first slidable door provides selective access to the first welding table and the second welding door provides selective access to the second welding table.

15. The unit of claim 14, wherein the first slidable door is slidable to a position interposed between the first welding table and the second welding table.

16. The unit of claim 15, wherein the second slidable door is slidable to a position interposed between the first welding table and the second welding table.

17. The unit of claim 14, wherein each slidable door includes a window.

18. The unit of claim 1, wherein the cell unit door comprises a folding door having an internal hinge.

19. The unit of claim 1, further comprising a rear knockout wall disposed behind the robot.

20. The unit of claim 1, further comprising a torch conditioner compartment mounted to the frame.

21. The unit of claim 20, further comprising a reamer disposed in the torch conditioner compartment.

22. The unit of claim 1, further comprising a touch sensing probe located within the frame.

23. The unit of claim 1, further comprising a reel shaft extending from the frame.

24. The unit of claim 1, further comprising a wire feed motor attached to the frame.

25. The unit of claim 1, further comprising a positioning flange having an arcuate edge extending from the frame.

26. The unit of claim 25, wherein the positioning flange includes a hook for a chain.

27. The unit of claim 1, further comprising a tool drawer mounted to the frame.

28. The unit of claim 27, wherein the tool drawer is mounted underneath the cell unit door.

29. The unit of claim 28, further comprising an auxiliary outlet mounted underneath the tool drawer.

30. The unit of claim 1, further comprising a pendant hook attached to the frame.

31. The unit of claim 1, wherein the frame is adapted to be lifted by a fork lift.

32. The unit of claim 31, wherein the frame includes a side fork lift receptacle.

33. The unit of claim 32, wherein the frame includes at least two side fork lift receptacles.

34. The unit of claim 32, wherein the frame includes a front/rear fork lift receptacle.

35. The unit of claim 34, wherein the frame includes at least two front/rear fork lift receptacles.

36. The unit of claim 1, further comprising hooks for lifting the unit from overhead, the hooks attached to the frame.

37. A portable welding cell unit comprising:
    a frame;
    a first welding station located within the frame;
    a second welding station spaced from the first welding station and located within the frame;
    a door movable between an open and closed position and attached to the frame for providing selective access to at least one of the first welding station and the second welding station;

a side wall movably mounted to the frame;
a retractable panel attached to the side wall; and
a robot arm disposed in the frame.

38. The unit of claim 37, wherein the frame is dimensioned to fit into a bed of a pickup truck.

39. The unit of claim 37, wherein the side wall pivotally mounts to the frame.

40. The unit of claim 37, further comprising a retractable floor attached to the side wall and the retractable panel.

41. The unit of claim 37, wherein the side wall comprises first and second pivoting side walls attached to the frame.

42. The unit of claim 41, wherein the first side wall is opposite the second side wall.

43. The unit of claim 42, wherein the first side wall pivots in a first rotational direction and the second side wall pivots in a second rotational direction, which is opposite the first rotational direction.

44. The unit of claim 37, wherein the door is pivotally and slidably mounted to the frame.

45. The unit of claim 44, wherein the door is slidable to a position interposed between the first welding station and the second welding station.

46. The unit of claim 45, wherein the door comprises a material to provide arc shield protection.

47. The unit of claim 37, wherein the door comprises a material to provide arc shield protection.

48. The unit of claim 47, further comprising a window disposed in the door.

49. The unit of claim 48, wherein the window comprises an auto-darkening lens.

50. The unit of claim 37, wherein the door comprises a first door attached to the frame and associated with the first welding station and a second door attached to the frame and associated with the second welding station.

51. The unit of claim 50, wherein each door is pivotally mounted to the frame.

52. The unit of claim 51, wherein each door is slidably mounted to the frame.

53. The unit of claim 52, wherein each door is adapted to slide into the frame when opened at least 90 degrees from a closed position.

54. The unit of claim 53, wherein at least one of the doors includes a window.

55. The unit of claim 37, wherein the door comprises a folding door having an internal hinge.

56. The unit of claim 37, further comprising a rear knockout wall attached to the frame.

57. The unit of claim 56, further comprising a first rear wall and a second rear wall disposed on each side of the rear knockout wall, wherein each rear wall is generally parallel to and spaced from the rear knockout wall.

58. The unit of claim 57, wherein the rear knockout wall is disposed behind the robot to allow the robot more freedom of movement when rotating between the first welding station and the second welding station.

59. The unit of claim 37, further comprising a torch conditioner compartment mounted to the frame.

60. The unit of claim 37, further comprising a touch sensing probe located within the frame.

61. The unit of claim 37, further comprising a reel shaft extending from the frame.

62. The unit of claim 61, further comprising a wire feed motor attached to the frame.

63. The unit of claim 37, further comprising a wire feed motor attached to the frame.

64. The unit of claim 37, further comprising a positioning flange having arcuate edges extending from the frame.

65. The unit of claim 64, wherein the positioning flange includes a hook for a chain.

66. The unit of claim 37, further comprising a tool drawer mounted to the frame.

67. The unit of claim 37, further comprising an auxiliary outlet.

68. The unit of claim 37, further comprising a pendant hook attached to the frame.

69. The unit of claim 37, wherein the frame includes at least two forklift receptacles.

70. A portable welding cell unit comprising:
a frame;
a first welding station located within the frame;
a second welding station spaced from the first welding station and located within the frame;
a door movable between an open and closed position and attached to the frame for providing selective access to at least one of the first welding table and the second welding table;
a substantially box-shaped outrigger removably mounted to the frame; and
a robot arm disposed in the frame.

71. The unit of claim 70, wherein the outrigger is adapted to mount to the frame such that the outrigger extends into the frame.

72. The unit of claim 70, wherein the outrigger is adapted to mount to the frame such that the outrigger extends out of the frame.

73. The unit of claim 70, wherein the outrigger is open at the bottom.

74. The unit of claim 70, wherein the frame is configured to fit into a bed of a pickup truck.

* * * * *